(12) United States Patent
Endo (10) Patent No.: US 11,011,205 B2
(45) Date of Patent: May 18, 2021

(54) SERVO WRITER WITH MAGNETIC TAPE EDGE POLISHING UNIT AND SERVO SIGNAL WRITING METHOD THEREOF

(71) Applicant: Sony Corporation, Tokyo (JP)

(72) Inventor: Tetsuo Endo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/762,341

(22) PCT Filed: Nov. 9, 2018

(86) PCT No.: PCT/JP2018/041640
§ 371 (c)(1),
(2) Date: May 7, 2020

(87) PCT Pub. No.: WO2019/093469
PCT Pub. Date: May 16, 2019

(65) Prior Publication Data
US 2021/0043224 A1 Feb. 11, 2021

(30) Foreign Application Priority Data
Nov. 9, 2017 (JP) .............................. JP2017-216636

(51) Int. Cl.
*G11B 23/50* (2006.01)
*G11B 20/12* (2006.01)
*G11B 5/008* (2006.01)
*G11B 15/60* (2006.01)
*B24B 9/00* (2006.01)
(Continued)

(52) U.S. Cl.
CPC ............ *G11B 23/502* (2013.01); *B24B 9/002* (2013.01); *G11B 15/60* (2013.01); *G11B 20/1205* (2013.01); *G11B 5/00817* (2013.01); *G11B 5/02* (2013.01); *G11B 5/584* (2013.01)

(58) Field of Classification Search
None
See application file for complete search history.

(56) References Cited

U.S. PATENT DOCUMENTS 3,986,301 A * 10/1976 Lough et al. ............ G11B 5/84
451/261
2002/0186497 A1 12/2002 Nakao et al.
(Continued)

FOREIGN PATENT DOCUMENTS

JP       63214917 A *  9/1988 ............... G11B 5/84
JP       2002-367130    12/2002
(Continued)

OTHER PUBLICATIONS

International Search Report issued in Application No. PCT/JP2018/041640, dated Jan. 8, 2019.

*Primary Examiner* — Craig A. Renner
(74) *Attorney, Agent, or Firm* — K&L Gates LLP (57) ABSTRACT

A servo writer includes a writing head that writes a servo signal on a long magnetic tape that is traveling, a guide roller that is provided on an upstream side of a travel path with respect to the writing head and guides the traveling magnetic tape, and a polishing unit that is provided on an upstream side of the travel path with respect to the guide roller and polishes at least one edge of the traveling magnetic tape, in which the guide roller includes a flange that regulates the travel of the magnetic tape.

11 Claims, 7 Drawing Sheets

(51) Int. Cl.
  *G11B 5/02* (2006.01)
  *G11B 5/584* (2006.01)

(56) References Cited

U.S. PATENT DOCUMENTS

| | | |
|---|---|---|
| 2009/0016186 A1 | 1/2009 | Hata et al. |
| 2011/0205659 A1* | 8/2011 | Ohtsu et al. ............ G11B 5/584 |
| | | 360/55 |
| 2019/0057719 A1* | 2/2019 | Wiley .................. G11B 23/502 |

FOREIGN PATENT DOCUMENTS

| | | | | |
|---|---|---|---|---|
| JP | 2002367130 A | | 12/2002 | |
| JP | 2007-287237 | | 11/2007 | |
| JP | 2007-287238 | | 11/2007 | |
| JP | 2007287238 A | | 11/2007 | |
| JP | 2009-043392 | | 2/2009 | |
| JP | 2009043392 A | | 2/2009 | |
| JP | 2010061773 A | * | 3/2010 | ............... G11B 5/84 |
| JP | 2013-229085 | | 11/2013 | |
| JP | 2013229085 A | | 11/2013 | |

* cited by examiner

SERVO WRITER WITH MAGNETIC TAPE EDGE POLISHING UNIT AND SERVO SIGNAL WRITING METHOD THEREOF

TECHNICAL FIELD

The present disclosure relates to a servo writer and a servo signal writing method.

BACKGROUND ART

In recent years, in a magnetic tape used as a data storage for a computer, a data track width and an interval between adjacent data tracks are extremely narrow in order to improve data recording density. If the data track width and the interval between the adjacent data tracks are narrowed in this way, it is difficult to trace the data track by a recording/reproducing element of a magnetic head.

Therefore, a technology has been proposed that performs servo control on a position of the recording/reproducing element of the magnetic tape in the width direction of the magnetic tape by writing a servo signal on a magnetic tape in advance and reading the servo signal by the magnetic head.

Patent Document 1 proposes a servo writer including a guide roller that guides a traveling magnetic tape. The guide roller includes a cylindrical roller body that freely rotates around an axis and a flange that stands around an entire circumference of both ends of a circumferential surface of the roller body.

CITATION LIST

Patent Document

Patent Document 1: Japanese Patent Application Laid-Open No. 2007-287237

SUMMARY OF THE INVENTION

Problems to be Solved by the Invention

However, if the edge of the magnetic tape is deformed, the edge of the magnetic tape irregularly has contact with a flange, and there is a possibility that vibration caused by the contact adversely affects servo pattern writing accuracy. In particular, there is a possibility that, in a high recording density magnetic tape, the servo pattern writing accuracy is adversely affected.

An object of the present disclosure is to provide a servo writer that can improve servo signal writing accuracy and a servo signal writing method.

Solutions to Problems

To solve the above problem, a first disclosure is a servo writer that includes a writing head that writes a servo signal on a long magnetic tape that is traveling, a guide roller that is provided on an upstream side of a travel path with respect to the writing head and guides the traveling magnetic tape, and a polishing unit that is provided on an upstream side of the travel path with respect to the guide roller and polishes at least one edge of the traveling magnetic tape, in which the guide roller includes a flange that regulates the travel of the magnetic tape.

A second disclosure is a servo signal writing method that includes polishing at least one edge of a traveling magnetic tape, guiding the travel of the polished magnetic tape by a guide roller, and writing a servo signal on the magnetic tape guided by the guide roller, in which the guide roller includes a flange that regulates the travel of the magnetic tape.

Effects of the Invention

According to the present disclosure, servo signal writing accuracy can be improved. Note that the effects described herein are not necessarily limited and that the effect may be any effects described in the present disclosure or an effect different from the above effects.

MODE FOR CARRYING OUT THE INVENTION

Embodiments of the present disclosure will be described in the following order.

1 First Embodiment (Example of Servo Writer)
2 Second Embodiment (Example of Servo Writer)
3 Third Embodiment (Example of Servo Writer)

1 First Embodiment

[Configuration of Servo Writer]

Figure 1:
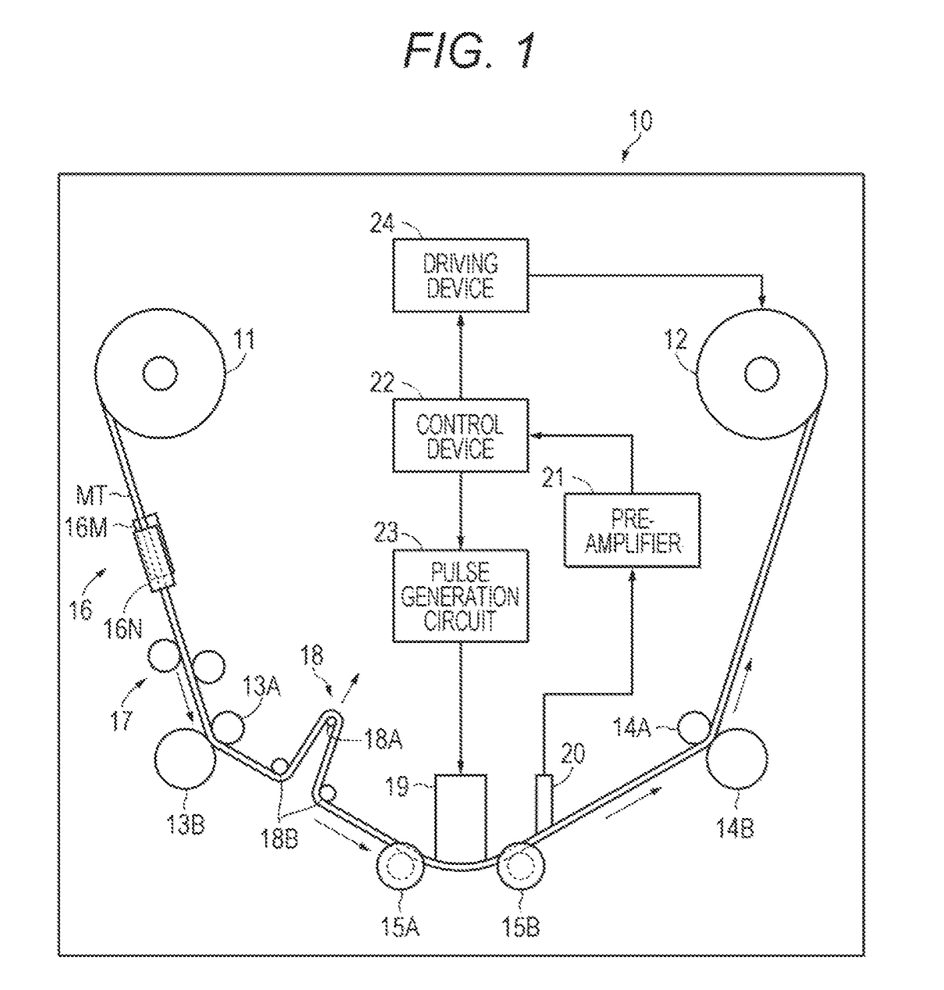
FIG. 1 is a schematic diagram illustrating a configuration of a servo writer according to a first embodiment.

As illustrated in FIG. 1, a servo writer 10 according to a first embodiment includes a delivery reel 11, a winding reel 12, capstans 13A and 14A, pinch rollers 13B and 14B, guide rollers 15A and 15B, a polishing unit 16, a dusting unit 17, a tension adjusting unit 18, a servo signal writing head 19, a servo signal reading head 20, a pre-amplifier 21, a control device 22, a pulse generation circuit 23, and a driving device 24. The servo writer 10 is a magnetic tape device that writes a servo signal on a servo band of a long magnetic tape MT.

(Delivery and Winding Reels)

The delivery reel 11 sends the magnetic tape MT on which the servo signal is written. The winding reel 12 winds up the magnetic tape MT on which the servo signal has been written.

(Capstan and Pinch Roller)

The capstan 13A and the pinch roller 13B are provided on an upstream side of a travel path of the magnetic tape MT (hereinafter, simply referred to as "travel path") with respect to the servo signal writing head 19. More specifically, the capstan 13A and the pinch roller 13B are provided in the travel path between the delivery reel 11 and the servo signal writing head 19. Here, the upstream side and the downstream side respectively mean an upstream side and a downstream side in a traveling direction of the magnetic tape MT. The capstan 13A and the pinch roller 13B sandwich the magnetic tape MT sent from the delivery reel 11 and make the magnetic tape MT travel at a constant speed.

The capstan 14A and the pinch roller 14B are provided on the downstream of the travel path with respect to the servo signal writing head 19. More specifically, the capstan 14A and the pinch roller 14B are provided in the travel path between the winding reel 12 and the servo signal writing head 19. The capstan 14A and the pinch roller 14B sandwich the magnetic tape MT on which the servo signal has been written and make the magnetic tape MT travel at a constant speed.

(Guide Roller)

The guide roller 15A is provided on the upstream side of the travel path with respect to the servo signal writing head 19. More specifically, the guide roller 15A is provided in the travel path between the capstan 13A and the pinch roller 13B and the servo signal writing head 19 and guides the magnetic tape MT that travels from the capstan 13A and the pinch roller 13B toward the servo signal writing head 19.

The guide roller 15B is provided on the downstream side of the travel path with respect to the servo signal writing head 19. More specifically, the guide roller 15B is provided in the travel path between the servo signal writing head 19 and the capstan 14A and the pinch roller 14B and guides the magnetic tape MT that travels from the servo signal writing head 19 toward the capstan 14A and the pinch roller 14B.

Figure 2:
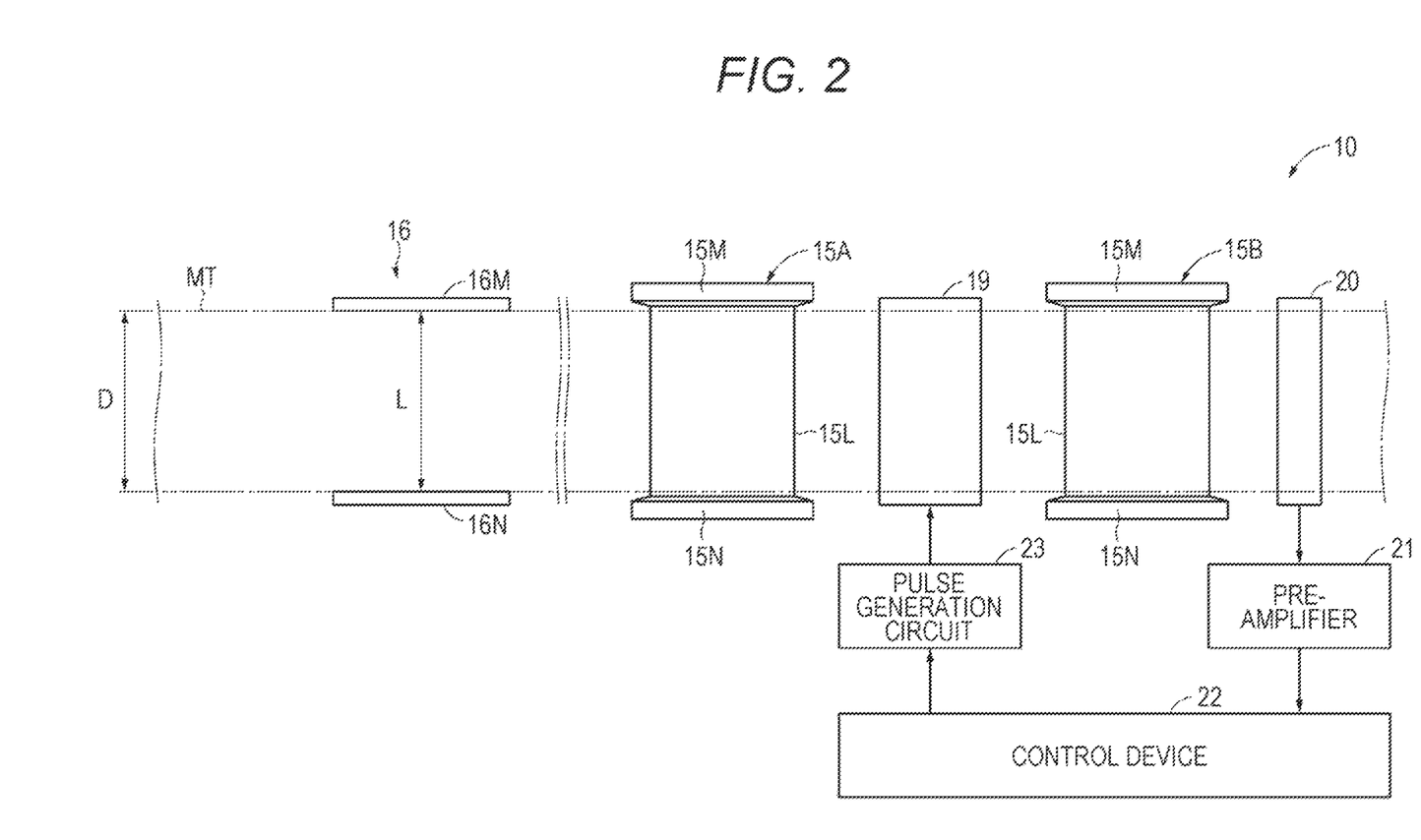
FIG. 2 is a schematic diagram illustrating a part of the configuration of the servo writer according to the first embodiment.

As illustrated in FIG. 2, the guide roller 15A includes a cylindrical roller body 15L that is configured to be freely rotatable around the axis and has contact with a rear surface of the magnetic tape MT and a pair of flanges 15M and 15N that regulates the traveling position of the traveling magnetic tape MT. Here, the rear surface of the magnetic tape MT means a surface opposite to a recording surface of both main surfaces of the magnetic tape MT on which the servo signal writing head 19 slides. The flanges 15M and 15N are provided at both ends of the circumferential surface of the roller body 15L and are projected from the circumferential surface of the roller body 15L.

Since the configuration of the guide roller 15B is similar to that of the guide roller 15A, description thereof will be omitted.

(Polishing Unit)

The polishing unit 16 is provided on the upstream side of the travel path with respect to the guide roller 15A and polishes a first and second edges of the traveling magnetic tape MT. More specifically, the polishing unit 16 is provided in the travel path between the delivery reel 11 and the capstan 13A and the pinch roller 13B and polishes the first and the second edges of the magnetic tape MT that travels from the delivery reel 11 toward the capstan 13A and the pinch roller 13B. Here, the first and the second edges mean both edges positioned in the width direction of the magnetic tape MT.

As illustrated in FIG. 2, the polishing unit 16 includes abrasives 16M and 16N opposed to each other having the travel path therebetween. The abrasives 16M and 16N are fixed so that a distance L between the abrasives 16M and 16N is the same as or substantially the same as a width D of the magnetic tape MT. The abrasives 16M and 16N respectively polish the first and the second edges of the traveling magnetic tape MT. In order to enhance linearity of the first and the second edges of the traveling magnetic tape MT, it is preferable that the abrasives 16M and 16N include planar polishing surfaces that respectively polish the first and the second edges of the traveling magnetic tape MT. Here, "the distance L between the abrasives 16M and 16N is the same as or substantially the same as the width D of the magnetic tape MT" means that the distance L between the abrasives 16M and 16N is within a range of $D-(2\times d)[mm] \leq L \leq D[mm]$ (however, d is thickness of magnetic tape MT). Furthermore, the distance L between the abrasives 16M and 16N means a distance between the polishing surfaces of the abrasives 16M and 16N. Note that, if the distance L satisfies $D-(2\times d)[mm] \leq L$, buckling of the magnetic tape MT can be prevented by shortening the distance between the abrasives 16M and 16N. On the other hand, if the distance L satisfies $L \leq D[mm]$, it is possible to polish the first and the second edges of the magnetic tape MT by the abrasives 16M and 16N.

(Dusting Unit)

The dusting unit 17 is provided on the downstream side of the travel path with respect to the polishing unit 16. More specifically, the dusting unit 17 is provided in the travel path between the polishing unit 16 and the capstan 13A and the pinch roller 13B and removes dusts, dirt, or the like attached to the magnetic tape MT by polishing by the polishing unit 16.

(Tension Adjusting Unit)

The tension adjusting unit 18 is a device that applies tension to the magnetic tape MT in the longitudinal direction in order to suppress vibration of the traveling magnetic tape MT and is provided on the upstream side of the travel path with respect to the servo signal writing head 19. More specifically, the tension adjusting unit 18 is provided between the capstan 13A and the pinch roller 13B and the guide roller 15D. However, the tension adjusting unit 18 may be provided on the downstream side of the travel path with respect to the servo signal writing head 19 and may be provided both on the upstream side and downstream side of the travel path with respect to the servo signal writing head 19.

The tension adjusting unit 18 includes a tension arm 18A and a pair of supporting units 18B.

The tension arm 18A applies tension on the magnetic tape MT in the longitudinal direction by stretching the traveling magnetic tape MT and appropriately controls winding tension. The tension arm 18A is configured to be movable by being biased by a spring and the like in an arrow direction in FIG. 1. The pair of supporting units 18B supports parts positioned on both sides of the tension arm 18A of the traveling magnetic tape MT.

Note that the configuration of the tension adjusting unit 18 is not limited to this, and may be an air chamber or the like that applies tension to the magnetic tape MT in the longitudinal direction by suctioning air near the traveling magnetic tape MT and suctioning a part of the magnetic tape MT.

(Servo Signal Writing Head)

The servo signal writing head 19 is provided in the travel path between the guide rollers 15B and 15B. The servo signal writing head 19 is a magnetic head that writes a servo signal on the servo band of the traveling magnetic tape MT. As the servo signal writing head 19, for example, the one described in JP 2006-127730 A can be used.

The servo signal writing head 19 includes a sliding surface that slides on the magnetic tape MT, and a plurality of recording elements and at least one bottomed cavity (recess) are provided on the sliding surface. The recording element has a magnetic gap. The plurality of magnetic gaps is arranged in a row at predetermined intervals on the sliding surface so as to correspond to the position of each servo band in the width direction of the magnetic tape MT.

The periphery of the bottomed cavity is closed, and the bottomed cavity is formed only within a traveling region width of the magnetic tape MT. By providing the bottomed cavity having such a configuration on the sliding surface, expansion of air between the sliding surface and the magnetic tape MT is facilitated at the time when the magnetic tape MT travels, and decrease in air pressure, that is, a negative pressure reduces spacing and improves the traveling stability of the magnetic tape MT.

(Servo Signal Reading Head)

The servo signal reading head 20 is provided on the downstream side of the travel path with respect to the servo signal writing head 19. More specifically, the servo signal reading head 20 is provided in the travel path between the servo signal writing head 19 and the guide roller 15B.

The servo signal reading head 20 is a magnetic head that slides on the magnetic tape MT on which the servo signal is written and reads the servo signal written on the servo band. The configuration of the servo signal reading head 20 is similar to the servo signal writing head 19 other than a point, for example, that a plurality of reproducing elements is included instead of the plurality of recording elements.

(Pre-Amplifier)

The pre-amplifier 21 amplifies the servo signal read by the servo signal reading head 20 and supplies the amplified signal to the control device 22.

(Control Device)

The control device 22 is a device that controls an operation of each unit of the servo writer 10 and includes a central processing unit (CPU), various storage devices, or the like. The control device 22 generates a pulse control signal which is used to control a current value, a pulse width, and a generation timing of a recording pulse current so that the servo signal written on the magnetic tape MT by the servo signal writing head 19 has a predetermined servo pattern and supplies the generated signal to the pulse generation circuit 23.

The control device 22 sets a current value of the recording pulse current so that an output value of the servo signal is substantially constant (within predetermined range) on the basis of the servo signal supplied from the servo signal reading head 20 via the pre-amplifier 21 and supplies the signal to the pulse generation circuit 23. That is, the control device 22 controls the recording pulse current on the basis of the output value of the servo signal read by the servo signal reading head 20.

To set the traveling speed of the magnetic tape MT when the servo signal is written to be constant, the control device 22 generates a motor current signal used to control a motor current of the driving device 24 and supplies the signal to the driving device 24.

(Pulse Generation Circuit)

The pulse generation circuit 23 generates a recording pulse current on the basis of the pulse control signal supplied from the control device 22 and supplies the current to the servo signal writing head 19.

(Driving Device)

The driving device 24 is a device that rotates and drives the winding reel 12 and includes a motor, a motor driving circuit used to supply a current to the motor, a gear that couples a motor shaft and the winding reel 12, or the like. The driving device 24 generates the motor current by the motor driving circuit on the basis of the motor current signal supplied from the control device 22 and supplies the motor current to the motor so as to transmit a rotation driving force of the motor to the winding reel 12 via the gear and rotate and drive the winding reel 12.

[Servo Signal Writing Method]

A servo signal writing method by using the servo writer 10 will be described below.

First, prior to the driving of the servo writer 10, as illustrated in FIG. 1, a pancake-like magnetic tape MT is set as the delivery reel 11 of the servo writer 10, and a front end of the magnetic tape MT is pulled out. Then, the front end of the magnetic tape MT is coupled to a winding core of the winding reel 12 via the polishing unit 16, the dusting unit 17, the capstan 13A, the pinch roller 13B, the tension adjusting unit 18, the guide rollers 15A and 15B, the capstan 14A and the pinch roller 14B.

Next, when an operation panel which is not illustrated is operated and a servo signal writing operation is started, the control device 22 drives the driving device 24, rotates the winding reel 12, and makes the winding reel 12 wind the magnetic tape MT. With this operation, the magnetic tape MT travels from the delivery reel 11 to the winding reel 12 as follows.

First, after the first and the second edges of the traveling magnetic tape MT unwound from the delivery reel 11 are respectively polished by the abrasives 16M and 16N, the dusting unit 17 removes dusts, dirt, or the like attached to the magnetic tape MT. Subsequently, the travel of the polished magnetic tape MT is guided by the guide roller 15A, and the magnetic tape MT reaches the servo signal writing head 19, and the servo signal is written on the magnetic tape MT by the servo signal writing head 19. Thereafter, the travel of the magnetic tape MT on which the servo signal has been written is guided by the guide roller 15B, and the magnetic tape MT reaches the winding reel 12 and is wound by the winding reel 12.

Figure 3:
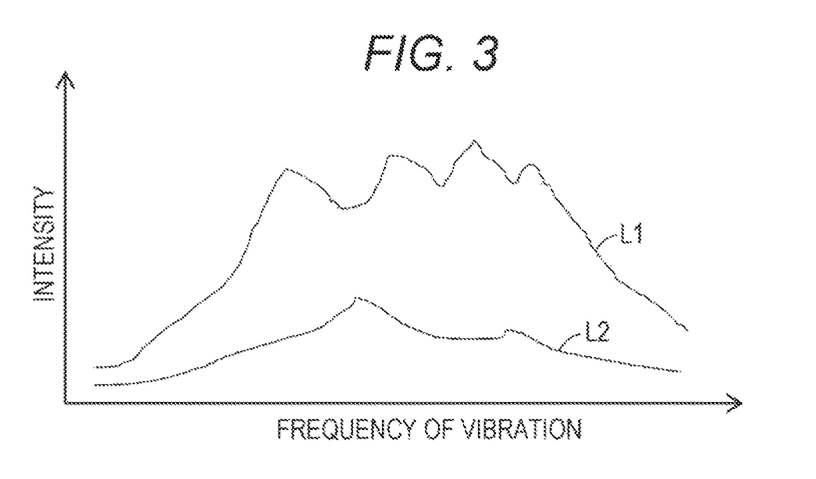
FIG. 3 is a diagram illustrating a spectrum graph of a PES.

FIG. 3 illustrates a spectrum graph of a position error signal (PES). Note that a spectrum L1 indicates a spectrum of a PES of the magnetic tape MT on which the servo signal is written by another servo writer. Here, the other servo writer means a servo writer that has a configuration obtained by omitting the polishing unit 16 from the servo writer 10. On the other hand, a spectrum L2 indicates a spectrum of a PES of the magnetic tape MT on which the servo signal is written by using the servo writer 10.

With the other servo writer, if the first and the second edges of the magnetic tape MT are deformed in an uneven shape or the like, there is a possibility that the following problems occur. That is, in a case where the servo signal writing head 19 has contact with the flanges 15M and 15N of the guide roller 15A, as indicated by the spectrum L1 in FIG. 3, there is a possibility that natural vibration is secondarily caused and servo signal writing accuracy deteriorates.

On the other hand, with the servo writer 10, even if the first and the second edges of the magnetic tape MT are deformed in an uneven shape or the like, the polishing unit 16 can polish the first and the second edges of the magnetic tape MT on the upstream side of the travel path with respect to the guide roller 15A, and the linearity of the first and the second edges can be improved. Therefore, even in a case where the servo signal writing head 19 has contact with the flanges 15M and 15N of the guide roller 15A, as indicated by the spectrum L2 in FIG. 3, it is possible to prevent secondarily occurrence of the natural vibration and to improve the servo signal writing accuracy.

[Effect]

The servo writer 10 according to the first embodiment includes the servo signal writing head 19 that writes the servo signal on the long magnetic tape MT that is traveling, the guide roller 15A that is provided on the upstream side of the travel path with respect to the servo signal writing head 19 and guides the traveling magnetic tape MT, and the polishing unit 16 that is provided on the upstream side of the travel path with respect to the guide roller 15A and polishes the first and the second edges of the traveling magnetic tape MT. With this structure, even in a case where the first and the second edges of the magnetic tape MT wound by the delivery reel 11 are deformed, it is possible to polish the first and the second edges of the magnetic tape MT by the polishing unit 16 before the magnetic tape MT is conveyed to the guide roller 15A, and it is possible to improve the linearity of the first and the second edges. Therefore, irregular contact between the first and the second edges of the magnetic tape MT and the flanges 15M and 15N can be prevented. Therefore, the servo pattern writing accuracy can be improved.

[Modification]

The servo writer 10 may include the plurality of guide rollers 15A in the travel path between the capstan 13A and the pinch roller 13B and the servo signal writing head 19. In this case, at least one of the plurality of guide rollers 15A may have contact with the rear surface of the magnetic tape MT, and the rest of the guide rollers 15A may have contact with the recording surface of the magnetic tape MT.

Furthermore, the servo writer 10 may include the plurality of guide rollers 15B in the travel path between the servo signal writing head 19 and the capstan 14A and the pinch roller 14B. In this case, at least one of the plurality of guide rollers 15B may have contact with the rear surface of the magnetic tape MT, and the rest of the guide rollers 15A may have contact with the recording surface of the magnetic tape MT.

The polishing unit 16 may include one of the abrasives 16M and 16N. However, from the viewpoint of the improvement in the servo pattern writing accuracy, as in the first embodiment, it is preferable that the polishing unit 16 include both of the abrasives 16M and 16N.

The abrasives 16M and 16N may be provided at different positions in the traveling direction of the magnetic tape MT.

The magnetic tape MT may be a coating-type magnetic tape on which an underlayer, a recording layer, or the like are produced by a coating process (wet process) or a thin-film magnetic tape of which an underlayer, a recording layer, or the like are produced by a vacuum thin film producing technology (dry process) such as sputtering. Furthermore, the magnetic tape MT may be a vertical recording magnetic tape or a horizontal recording magnetic tape.

2 Second Embodiment

[Configuration of Servo Writer]

Figure 4:
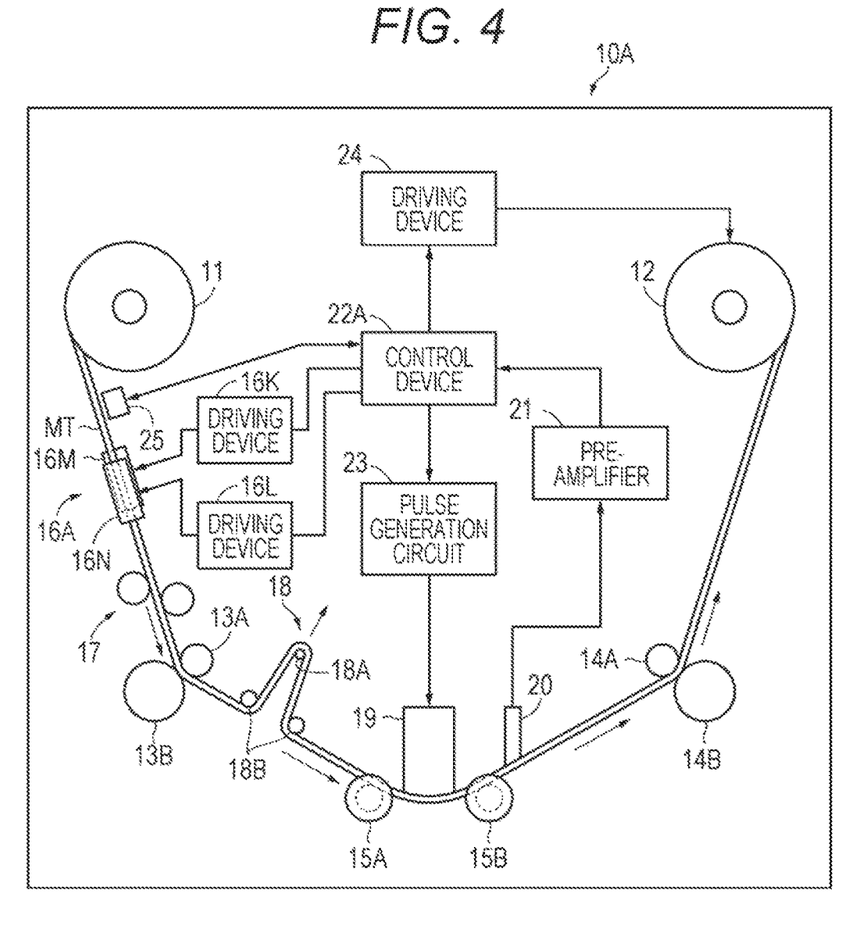
FIG. 4 is a schematic diagram illustrating a configuration of a servo writer according to a second embodiment.
Figure 5:
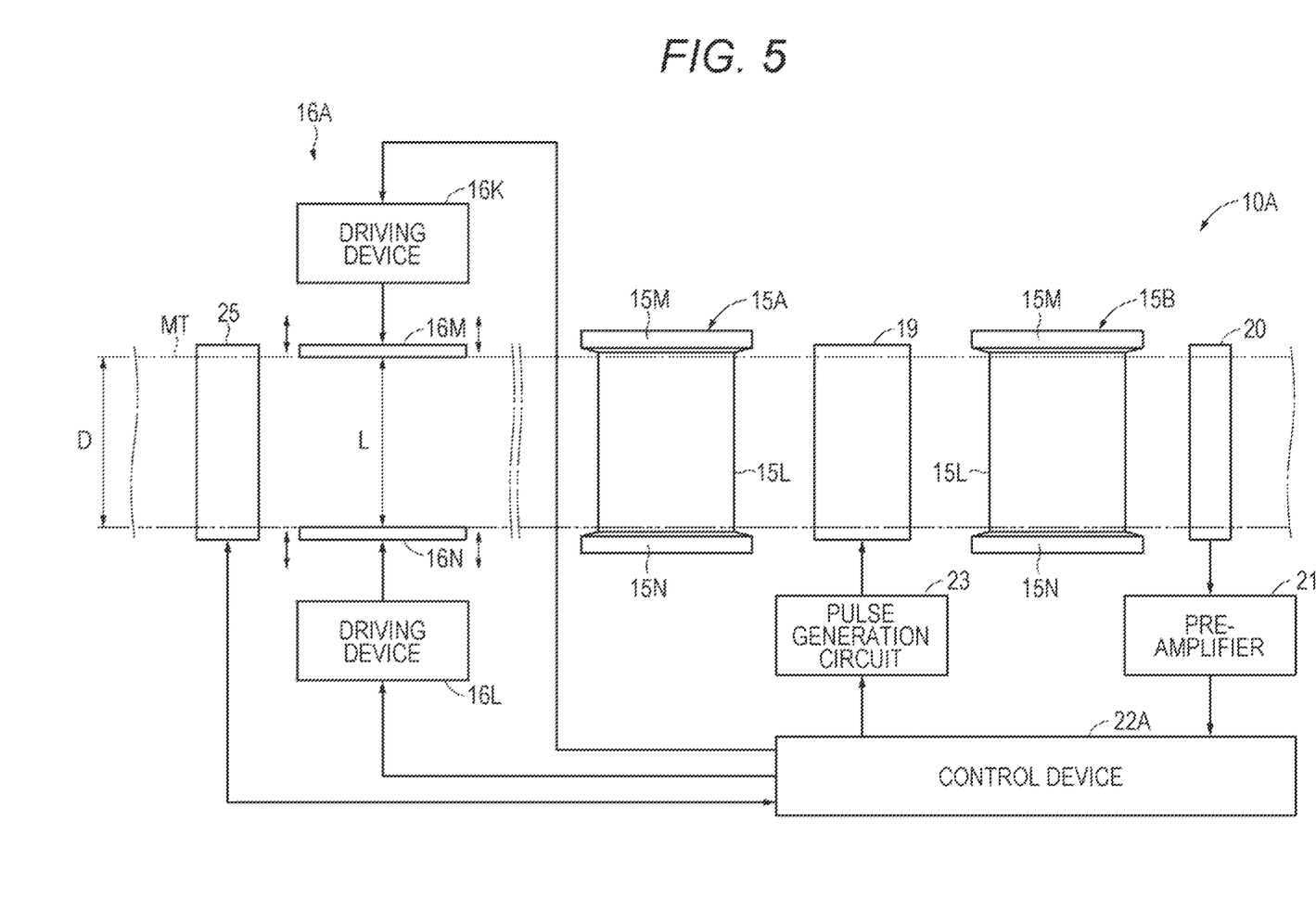
FIG. 5 is a schematic diagram illustrating a part of the configuration of the servo writer according to the second embodiment.

As illustrated in FIGS. 4 and 5, a servo writer 10A according to a second embodiment is different from the servo writer 10 according to the first embodiment in that a control device 22A and a polishing unit 16A are included instead of the control device 22 and the polishing unit 16 and a detection unit 25 is further included. Note that components in the second embodiment similar to those in the first embodiment are denoted with the same reference numerals, and description thereof will be omitted.

(Polishing Unit)

The polishing unit 16A includes abrasives 16M and 16N and driving devices 16K and 16L. The driving devices 16K and 16L are configured to be able to respectively move the abrasives 16M and 16N in a width direction of a traveling magnetic tape MT on the basis of control by the control device 22A. Other points of the configuration of the polishing unit 16A are similar to those of the polishing unit 16 according to the first embodiment.

(Detection Unit)

The detection unit 25 is provided on the upstream side of the travel path with respect to the polishing unit 16. More specifically, the detection unit 25 is provided in the travel path between the delivery reel 11 and the polishing unit 16 and detects positions of a first and a second edges of the magnetic tape MT that travels from the delivery reel 11 toward the polishing unit 16 and supplies the detection result to the control device 22. As the detection unit 25, for example, an optical sensor, an imaging element, or the like can be used.

(Control Device)

The control device 22 calculates a width D of the magnetic tape MT on the basis of the positions of the first and the second edges of the magnetic tape MT supplied from the detection unit 25, drives the driving devices 16K and 16L on the basis of the calculation result, and adjusts a distance L between the abrasives 16M and 16N. More specifically, the distance L between the abrasives 16M and 16N is adjusted so that the distance L between the abrasives 16M and 16N is the same as or substantially the same as the calculated width D of the magnetic tape MT. Here, "the distance L between the abrasives 16M and 16N is the same as or substantially the same as the calculated width D of the magnetic tape MT" means that the distance L between the abrasives 16M and 16N is within a range of $D-(2\times d)[mm] \leq L \leq D[mm]$ (however, d is thickness of magnetic tape MT).

[Servo Signal Writing Method]

Hereinafter, a servo signal writing method by using the servo writer 10A will be described with reference to FIG. 6.

First, when an operator performs a servo signal writing operation by using an operation panel which is not illustrated, in step S11, the control device 22 drives the driving device 24 and rotates the winding reel 12, and makes the winding reel 12 wind the magnetic tape MT.

Next, in step S12, the detection unit 25 detects the positions of the first and the second edges of the traveling magnetic tape MT and supplies the detection result to the control device 22. Next, in step S13, the control device 22 calculates the width D of the traveling magnetic tape MT on the basis of the positions of the first and the second edges of the magnetic tape MT from the detection unit 25.

Next, in step S14, the control device 22A determines whether or not the distance L between the abrasives 16M and 16N is the same as or substantially the same as the width D of the magnetic tape MT calculated in step S13.

In a case where it is determined in step S14 that the distance L between the abrasives 16M and 16N is the same as or substantially the same as the width D of the magnetic tape MT calculated in step S14, the control device 22A returns the processing to step S12. On the other hand, in a case where it is determined in step S14 that the distance L between the abrasives 16M and 16N is not the same as or not substantially the same as the width D of the magnetic tape MT calculated in step S14, the control device 22A executes the following processing in step S15. That is, the driving devices 16K and 16L are driven so as to move the abrasives 16M and 16N in the width direction of the traveling magnetic tape MT, and the distance L between the abrasives 16M and 16N is set to be the same as or substantially the same as the width D of the magnetic tape MT calculated in step S14.

[Effect]

The servo writer 10B according to the second embodiment includes the abrasives 16M and 16N that polish the traveling magnetic tape MT, the driving devices 16K and 16L that move the abrasives 16M and 16N in the width direction of the traveling magnetic tape MT, the detection unit 25 that detects the width D of the traveling magnetic tape MT, and the control device 22A that drives the driving devices 16K and 16L and adjusts the distance L between the abrasives 16M and 16N on the basis of the width D of the magnetic tape MT detected by the detection unit 25. With this structure, the distance L between the abrasives 16M and 16N can be held to be the same as or substantially the same as the width D of the traveling magnetic tape MT. Therefore, it is possible to prevent that the abrasives 16M and 16N excessively polish the first and the second edges of the magnetic tape MT and damage the first and the second edges. Furthermore, an excessive increase in frictional force with respect to the first and the second edges can be suppressed, and a disorder (jitter) of a traveling speed of the magnetic tape MT can be suppressed. Furthermore, even in a case where the width D of the magnetic tape MT send out from the delivery reel 11 fluctuates, generation of a part that is not polished by the first and the second edges of the magnetic tape MT can be prevented.

[Modification]

By driving the driving devices 16K and 16L and moving the abrasives 16M and 16N on the basis of the servo signal read by the servo signal reading head 20, the control device 22A may adjust polishing amounts of the first and the second edges of the magnetic tape MT. In this case, on the basis of the detection result of the width D of the magnetic tape MT by the detection unit 25, the control device 22A may drive the driving devices 16K and 16L and may perform control for adjusting the distance L between the abrasives 16M and 16N, or it is not necessary to perform the above control. In a case where the control device 22A does not perform the control, it is not necessary to provide the detection unit 25. Note that the control device 22A may adjust the distance L between the abrasives 16M and 16N by feedback control and adjust the polishing amounts of the first and the second edges of the magnetic tape MT to be appropriate.

Hereinafter, a servo signal writing method in a case where the polishing amount is adjusted on the basis of the servo signal will be described with reference to FIG. 7.

First, when an operator performs a servo signal writing operation by using an operation panel which is not illustrated, in step S21, the control device 22 drives the driving device 24 and rotates the winding reel 12, and makes the winding reel 12 wind the magnetic tape MT.

Next, in step S22, the servo signal reading head 20 reads a servo signal on the traveling magnetic tape MT and supplies the read signal to the control device 22A via the pre-amplifier 21. Next, in step S23, the control device 22A calculates a PES from the servo signal supplied from the servo signal reading head 20 via the pre-amplifier 21. Next, in step S24, after detecting a jitter component of the PES calculated in step S23, the control device 22A determines in step S25 whether or not the detected jitter component increases in excess of a reference value. Here, a specified value is, for example, a value twice of the jitter of the normal part. The jitter of the normal part means a power spectral density (PSD) of the jitter of the normal part in a certain range.

In a case where it is determined in step S25 that the jitter component increases in excess of the reference value, the control device 22A executes the following processing in step S26. That is, by driving the driving devices 16K and 16L, moving the abrasives 16M and 16N in the width direction of the traveling magnetic tape MT, and widening the distance L between the abrasives 16M and 16N, the polishing amounts of the abrasives 16M and 16N are reduced.

Figure 6:
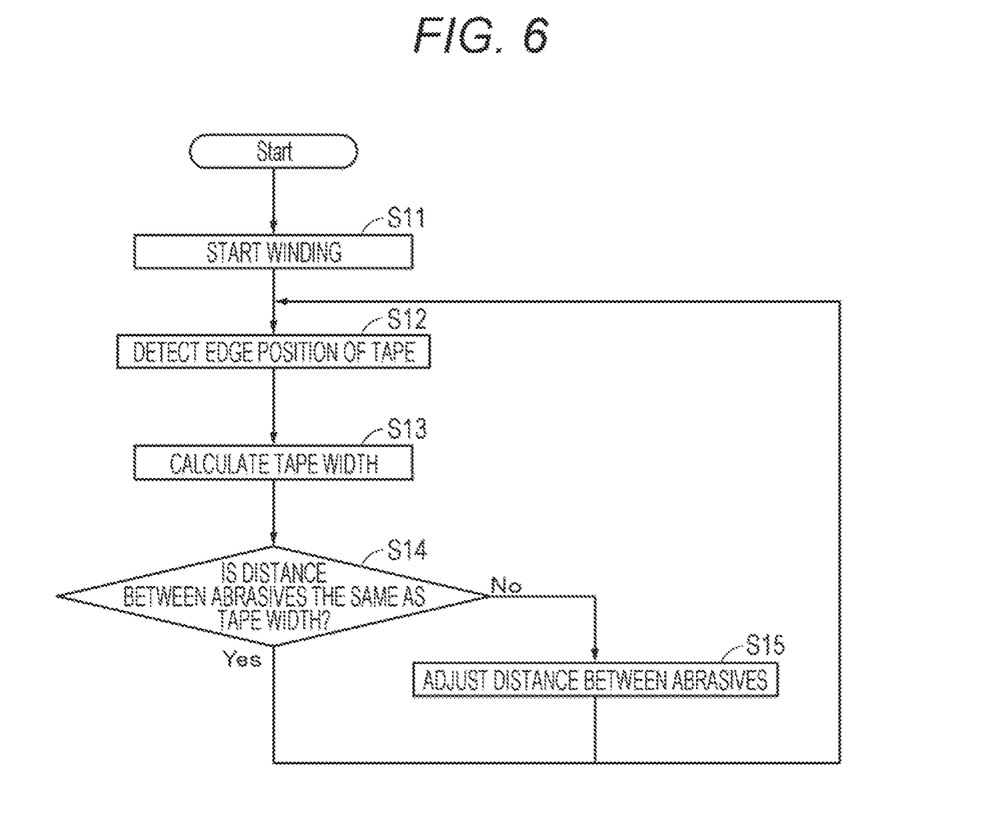
FIG. 6 is a flowchart for explaining a servo signal writing method according to the second embodiment.
Figure 7:
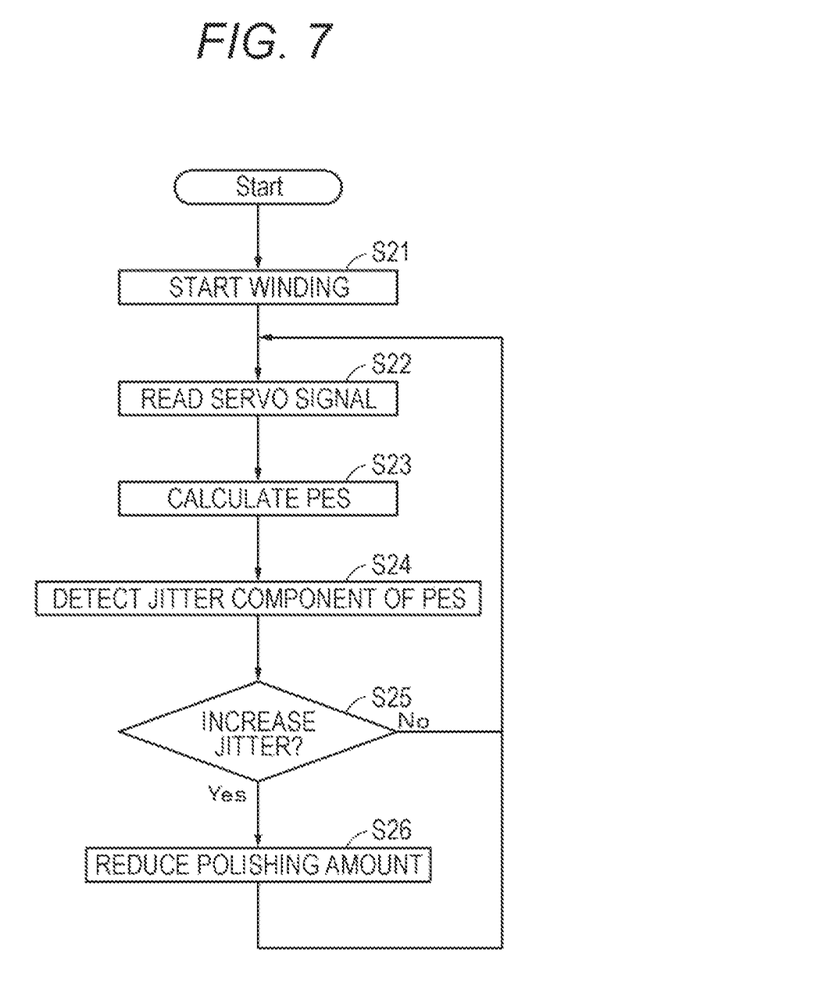
FIG. 7 is a flowchart for explaining a servo signal writing method according to a modification of the second embodiment.

Note that the servo writer 10A may be configured to be able to execute both the processing illustrated in FIG. 6 and the processing illustrated in FIG. 7 or may be configured to be able to execute only the processing illustrated in FIG. 7.

In the second embodiment, a case has been described in which the servo writer 10A has the configuration in which both of the abrasives 16M and 16N can move. However, the servo writer 10A may have a configuration in which one of the abrasives 16M and 16N can move. In this case, it is sufficient that the servo writer 10A include only one of the driving devices 16K and 16L.

The control device 22A may adjust the distance L between the abrasives 16M and 16N by feedback control and set the distance L between the abrasives 16M and 16N to be substantially the same as the width D of the traveling magnetic tape MT.

3 Third Embodiment

[Configuration of Servo Writer]

Figure 8:
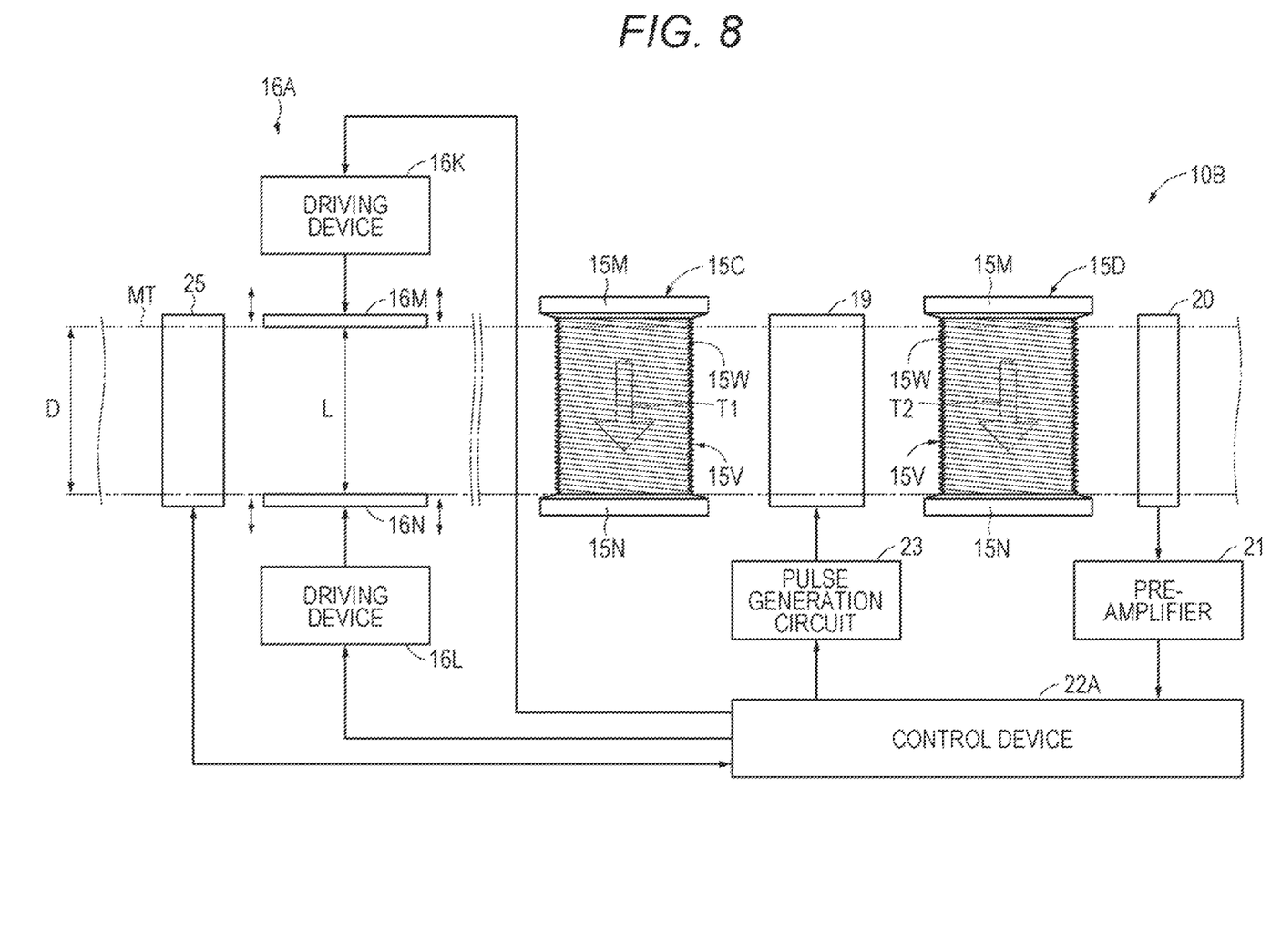
FIG. 8 is a schematic diagram illustrating a part of a configuration of a servo writer according to a third embodiment.

As illustrated in FIG. 8, a servo writer 10B according to a third embodiment is different from the servo writer 10A according to the second embodiment in that guide rollers 15C and 15D are included instead of the guide rollers 15A and 15B. Note that components in the third embodiment similar to those in the second embodiment are denoted with the same reference numerals, and description thereof will be omitted.

(Guide Roller)

Each of the guide rollers 15C and 15D includes a roller body 15V, on which a spiral groove 15W having a rotation axis of each of the guide rollers 15A and 15B as the central axis is provided, that has a circumferential surface that has contact with a traveling magnetic tape MT.

As described above, by providing the spiral groove 15W in the circumferential surface of the roller body 15V, tensile forces T1 and T2 act on the magnetic tape MT from the guide rollers 15A and 15B in a first width direction of the traveling magnetic tape MT. As a result, since the traveling magnetic tape MT moves closer to one side on the circumferential surface of the roller body 15V, it is possible to slide the first edge of the magnetic tape MT on a flange 15N and regulate a traveling position of the magnetic tape MT. Therefore, it is possible to stably travel the magnetic tape MT. Note that the tensile forces T1 and T2 may be the same or different from each other.

Note that, in actual, the tensile force oblique to the traveling direction of the magnetic tape MT acts on the magnetic tape MT from the guide rollers 15A and 15B. However, here, description will be made as focusing on a component of the tensile force acting in the first width direction of the traveling magnetic tape MT from among the tensile forces.

[Effect]

In the servo writer 10B according to the third embodiment, each of the guide rollers 15C and 15D includes the roller body 15V, on which the spiral groove 15W is provided, that has the circumferential surface having contact with the traveling magnetic tape MT and the flange 15N that slides on the first edge of the magnetic tape MT that has moved to one side in the width direction of the circumferential surface by the groove 15W. The abrasive 16N polishes the first edge of the magnetic tape MT slid by the flange 15N. With this structure, even in a case where the first edge of the magnetic tape MT wound by the delivery reel 11 is deformed, it is possible to polish the first edge of the magnetic tape MT by the polishing unit 16 before the magnetic tape MT is conveyed to the guide roller 15A, and it is possible to improve the linearity of the first edge. Therefore, irregular contact between the first edge of the magnetic tape MT and the flange 15N that slides on the first edge can be prevented. Therefore, the servo pattern writing accuracy can be improved.

[Modification]

It is not necessary for the servo writer 10B to include the driving device 16K and the abrasive 16M.

It is sufficient that the servo writer 10B do not include the driving device 16K and the abrasive 16M be fixed, and it is also sufficient that the servo writer 10B do not include the driving devices 16K and 16L and both the abrasives 16M and 16N be fixed as in the first embodiment.

The first to third embodiments and the modification have been specifically described above. However, the present disclosure is not limited to the first to third embodiments and the modifications and can be variously modified on the basis of the technical idea of the present disclosure.

For example, the configurations, the methods, the processes, the shapes, or the like in the first to third embodiments and the modifications are merely examples, and a configuration, a method, a process, a shape, or the like different from those may be used as necessary.

Furthermore, the configurations, the methods, the processes, the shapes, or the like in the first to third embodiments and the modifications can be combined with each other without departing from the spirit of the present disclosure.

Furthermore, the present disclosure can adopt the following configuration.

(1)

A servo writer including:

a writing head configured to write a servo signal on a long magnetic tape that is traveling;

a guide roller configured to be provided on an upstream side of a travel path with respect to the writing head and guide the traveling magnetic tape; and a polishing unit configured to be provided on an upstream side of the travel path with respect to the guide roller and polish at least one edge of the traveling magnetic tape, in which the guide roller includes a flange that regulates the travel of the magnetic tape.

(2)

The servo writer according to (1), further including:

a detection unit configured to be provided on an upstream side of the travel path with respect to the polishing unit and detect positions of a first and a second edges of the traveling magnetic tape; and a control unit configured to control the polishing unit on the basis of the positions of the first and the second edges detected by the detection unit.

(3)

The servo writer according to (1), in which the polishing unit includes:

a first abrasive that polishes a first edge of the traveling magnetic tape;

a second abrasive that polishes a second edge of the traveling magnetic tape; and a driving unit that moves at least one of the first abrasive or the second abrasive, and the servo writer further includes:

a detection unit configured to detect positions of the first and the second edges of the traveling magnetic tape; and a control unit configured to drive the driving unit on the basis of the positions of the first and the second edges detected by the detection unit and adjust a distance between the first and the second abrasives.

(4)

The servo writer according to (1), further including:

a reading head configured to read the servo signal written on the magnetic tape by the writing head; and a control unit configured to adjust a polishing amount by the polishing unit on the basis of the servo signal read by the reading head.

(5)

The servo writer according to (1), further including:

a reading head configured to read the servo signal written on the magnetic tape by the writing head; and a control unit configured to calculate a jitter from the servo signal read by the reading head and reduce a polishing amount by the polishing unit in a case where the calculated jitter exceeds a reference value.

(6)

The servo writer according to (1), in which the polishing unit includes:

a first abrasive that polishes a first edge of the traveling magnetic tape;

a second abrasive that polishes a second edge of the traveling magnetic tape; and a driving unit that moves at least one of the first abrasive or the second abrasive, and the servo writer further includes:

a reading head configured to read the servo signal written on the magnetic tape by the writing head; and a control unit configured to drive the driving unit on the basis of the servo signal read by the reading head and adjust a distance between the first abrasive and the second abrasive.

(7)

The servo writer according to any one of (1) to (6), in which the polishing unit has a planar polishing surface that polishes the edge.

(8)

The servo writer according to any one of (1) to (7), in which the polishing unit polishes both edges of the traveling magnetic tape.

(9)

The servo writer according to any one of (1) to (8), in which the guide roller includes:

a roller body on which a spiral groove is provided and which has a circumferential surface that applies a tensile force on the traveling magnetic tape in a width direction of the magnetic tape; and a flange that slides with a first edge of the magnetic tape that is moved to one side of the circumferential surface in the width direction by the tensile force, and the polishing unit polishes the first edge.

(10)

A servo signal writing method including:

polishing at least one edge of a traveling magnetic tape;

guiding the travel of the polished magnetic tape by a guide roller; and writing a servo signal on the magnetic tape guided by the guide roller, in which the guide roller includes a flange that regulates the travel of the magnetic tape.

REFERENCE SIGNS LIST

10, 10A, 10B Servo writer
11 Delivery reel

12 Winding reel
13A, 14A Capstan
13B, 14B Pinch roller
15A, 15B, 15C, 15D Guide roller
15L, 15V Roller body
15M, 15N Flange
15W Groove
16 Polishing unit
16M, 16N Abrasive
16K, 16L Driving device
17 Dusting unit
18 Tension adjusting unit
18A Tension arm
18B Supporting unit
19 Servo signal writing head
20 Servo signal reading head
21 Pre-amplifier
22, 22A Control device
23 Pulse generation circuit
24 Driving device
25 Detection unit
MT Magnetic tape
D Width of magnetic tape MT
L Distance between abrasives 16M and 16N
T1, T2 Tensile force

The invention claimed is:

1. A servo writer comprising:
a writing head configured to write a servo signal on a long magnetic tape that is traveling;
a guide roller configured to be provided on an upstream side of a travel path with respect to the writing head and guide the long magnetic tape;
a polishing unit configured to be provided on an upstream side of the travel path with respect to the guide roller and polish at least one edge of the long magnetic tape, wherein
the guide roller includes a flange that regulates the travel of the long magnetic tape;
a reading head configured to read the servo signal written on the long magnetic tape by the writing head; and
a control unit configured to adjust a polishing amount by the polishing unit on a basis of the servo signal read by the reading head.

2. The servo writer according to claim 1, further comprising:
a detection unit configured to be provided on an upstream side of the travel path with respect to the polishing unit and detect positions of a first and a second edges of the traveling magnetic tape;
wherein the control unit is configured to control the polishing unit on a basis of the positions of the first and the second edges detected by the detection unit.

3. The servo writer according to claim 1, wherein the polishing unit includes:
a first abrasive that polishes a first edge of the long magnetic tape;
a second abrasive that polishes a second edge of the long magnetic tape; and
a driving unit that moves at least one of the first abrasive or the second abrasive, and
the servo writer further comprises:
a detection unit configured to detect positions of the first and the second edges of the long magnetic tape;
wherein the control unit is configured to drive the driving unit on a basis of the positions of the first and the second edges detected by the detection unit and adjust a distance between the first and the second abrasives.

4. The servo writer according to claim 1, wherein the polishing unit has a planar polishing surface that polishes the edge.

5. The servo writer according to claim 1, wherein the polishing unit polishes both edges of the long magnetic tape.

6. The servo writer according to claim 1, wherein
the guide roller includes:
a roller body on which a spiral groove is provided and which has a circumferential surface that applies a tensile force on the long magnetic tape in a width direction of the long magnetic tape; and
the flange includes a flange part that slides with a first edge of the long magnetic tape that is moved to one side of the circumferential surface in the width direction by the tensile force, and
the polishing unit polishes the first edge.

7. A servo writer comprising:
a writing head configured to write a servo signal on a long magnetic tape that is traveling;
a guide roller configured to be provided on an upstream side of a travel path with respect to the writing head and guide the long magnetic tape;
a polishing unit configured to be provided on an upstream side of the travel path with respect to the guide roller and polish at least one edge of the long magnetic tape, wherein
the guide roller includes a flange that regulates the travel of the long magnetic tape;
a reading head configured to read the servo signal written on the long magnetic tape by the writing head; and
a control unit configured to calculate a jitter from the servo signal read by the reading head and reduce a polishing amount by the polishing unit in a case where the calculated jitter exceeds a reference value.

8. A servo writer comprising:
a writing head configured to write a servo signal on a long magnetic tape that is traveling;
a guide roller configured to be provided on an upstream side of a travel path with respect to the writing head and guide the long magnetic tape;
a polishing unit configured to be provided on an upstream side of the travel path with respect to the guide roller and polish at least one edge of the long magnetic tape, wherein
the guide roller includes a flange that regulates the travel of the long magnetic tape, wherein
the polishing unit includes:
a first abrasive that polishes a first edge of the long magnetic tape;
a second abrasive that polishes a second edge of the long magnetic tape; and
a driving unit that moves at least one of the first abrasive or the second abrasive, and
the servo writer further comprises:
a reading head configured to read the servo signal written on the long magnetic tape by the writing head; and
a control unit configured to drive the driving unit on a basis of the servo signal read by the reading head and adjust a distance between the first abrasive and the second abrasive.

9. A servo signal writing method comprising:
polishing at least one edge of a traveling magnetic tape;
guiding the travel of the polished magnetic tape by a guide roller; and writing a servo signal on the traveling magnetic tape guided by the guide roller with a writing head;
regulating the travel of the traveling magnetic tape with a flange of the guide roller;
reading the servo signal written on the traveling magnetic tape by the writing head with a reading head; and
adjusting a polishing amount by a polishing unit on a basis of the servo signal read by the reading head with a control unit.

10. A servo signal writing method comprising:
polishing at least one edge of a traveling magnetic tape;
guiding the travel of the polished magnetic tape by a guide roller;
writing a servo signal on the traveling magnetic tape guided by the guide roller with a writing head;
regulating the travel of the traveling magnetic tape with a flange of the guide roller;
reading the servo signal written on the traveling magnetic tape by the writing head with a reading head; and
calculating a jitter from the servo signal read by the reading head and reducing a polishing amount by a polishing unit in a case where the calculated jitter exceeds a reference value with a control unit.

11. A servo signal writing method comprising:
polishing at least one edge of a traveling magnetic tape;
guiding the travel of the polished magnetic tape by a guide roller; and
writing a servo signal on the traveling magnetic tape guided by the guide roller with a writing head;
regulating the travel of the traveling magnetic tape with a flange of the guide roller;
polishing a first edge of the traveling magnetic tape with a first abrasive;
polishing a second edge of the traveling magnetic tape with a second abrasive;
moving at least one of the first abrasive or the second abrasive with a driving unit;
reading the servo signal written on the traveling magnetic tape by the writing head with a reading head; and
driving the driving unit on a basis of the servo signal read by the reading head and adjusting a distance between the first abrasive and the second abrasive with a control unit.

\* \* \* \* \*